United States Patent
Moreno et al.

(10) Patent No.: US 12,316,539 B2
(45) Date of Patent: May 27, 2025

(54) INTER-COMPATIBLE FORWARDING MODES IN NETWORK FABRIC OVERLAYS

(71) Applicant: Cisco Technology, Inc., San Jose, CA (US)

(72) Inventors: Victor Manuel Moreno, Carlsbad, CA (US); Sanjay Kumar Hooda, Pleasanton, CA (US); Roberto Mitsuo Kobo, Pleasanton, CA (US); Balaji Pitta Venkatachalapathy, San Ramon, CA (US)

(73) Assignee: Cisco Technology, Inc., San Jose, CA (US)

( * ) Notice: Subject to any disclaimer, the term of this patent is extended or adjusted under 35 U.S.C. 154(b) by 241 days.

(21) Appl. No.: 17/703,965

(22) Filed: Mar. 24, 2022

(65) Prior Publication Data

US 2023/0308389 A1 Sep. 28, 2023

(51) Int. Cl.
*H04L 45/64* (2022.01)
*H04L 12/46* (2006.01)

(52) U.S. Cl.
CPC .......... *H04L 45/64* (2013.01); *H04L 12/4641* (2013.01)

(58) Field of Classification Search
CPC ..... H04L 45/64; H04L 12/4641; H04L 41/12; H04L 12/4633
See application file for complete search history.

(56) References Cited

U.S. PATENT DOCUMENTS

| | | | | |
|---|---|---|---|---|
| 6,570,881 B1 * | 5/2003 | Wils | ........................ | H04L 43/00 370/244 |
| 6,608,812 B1 * | 8/2003 | Wils | ........................ | H04L 1/22 370/389 |
| 7,630,405 B1 * | 12/2009 | Gao | ........................ | H04J 3/1617 370/476 |
| 7,697,534 B1 * | 4/2010 | Narayanan | .......... | H04L 12/4633 370/465 |
| 8,705,542 B2 * | 4/2014 | Gero | .................... | H04L 12/4641 370/389 |
| 8,843,588 B2 * | 9/2014 | Flinck | ................ | H04L 67/2895 709/217 |
| 8,892,725 B2 * | 11/2014 | Wang | .................. | H04L 63/1458 709/224 |
| 11,552,884 B1 * | 1/2023 | Koren | .................... | H04L 45/64 |

(Continued)

*Primary Examiner* — Madhu Woolcock
(74) *Attorney, Agent, or Firm* — Lee & Hayes, P.C.

(57) ABSTRACT

Methods and devices configure edge nodes of a virtual network overlay to continuously forward data plane traffic flows between client devices of a common subnet over the course of at least some of the edge nodes being EF-configured. TF-configured edge nodes and EF-configured edge nodes both play roles in unilaterally inducing address discovery by sending to client devices address discovery responses that were not prompted by address discovery requests. TF-configured edge nodes then handle ensuing address discovery requests by proxy, and subsequently handle certain traffic flows according to an EF-compatible forwarding mode, while EF-configured edge nodes continue to forward traffic flows by IP routing normally. This averts throughput of data plane traffic over the network overlay being reduced as a side effect of the heterogeneously configured edge nodes, and averts the possibility of client devices broadcasting address discovery protocol requests as a result of remote client devices being unreachable.

12 Claims, 4 Drawing Sheets

(56) References Cited

U.S. PATENT DOCUMENTS

| | | | |
|---|---|---|---|
| 2008/0291822 A1* | 11/2008 | Farkas | H04L 45/00 |
| | | | 370/216 |
| 2009/0144403 A1* | 6/2009 | Sajassi | H04L 12/4633 |
| | | | 709/223 |
| 2009/0154338 A1* | 6/2009 | Ozaki | H04L 45/64 |
| | | | 370/216 |
| 2012/0144031 A1* | 6/2012 | Hu | H04L 45/04 |
| | | | 709/224 |
| 2016/0352617 A1* | 12/2016 | Wang | H04L 45/22 |
| 2017/0126496 A1 | 5/2017 | Sikand et al. | |
| 2018/0115522 A1* | 4/2018 | Gleichauf | H04W 84/18 |
| 2018/0139133 A1 | 5/2018 | Makhijani et al. | |
| 2018/0367459 A1 | 12/2018 | Chandrasekaran et al. | |
| 2019/0182202 A1* | 6/2019 | Garcia Del Rio | H04L 49/70 |
| 2019/0215381 A1* | 7/2019 | Mukund | H04L 67/63 |
| 2019/0312809 A1* | 10/2019 | Hooda | H04L 45/741 |
| 2020/0021555 A1 | 1/2020 | Fernando et al. | |
| 2020/0067830 A1* | 2/2020 | Malhotra | H04L 45/586 |
| 2020/0204483 A1* | 6/2020 | Jain | H04L 45/64 |

\* cited by examiner

INTER-COMPATIBLE FORWARDING MODES IN NETWORK FABRIC OVERLAYS

TECHNICAL FIELD

The present disclosure relates generally to edge nodes in a programmable network fabric implemented based on a virtual network overlay performing intra-subnet forwarding by inter-compatible forwarding modes while unilaterally inducing address discovery.

BACKGROUND

Modern data centers encompass numerous network hosts, and data center administrators may frequently need to interconnect any two or more hosts to allow efficient end-to-end network traffic regardless of the physical scale and logical scale of the data center. Thus, data center administrators can deploy data center fabrics, which are logical network fabrics established over a layer of physical network devices, enabling data center administrators to program a control plane that configures network devices of the network fabric to establish virtual network connections.

By deploying data center fabrics over network devices of a data center, data center administrators can implement software-defined networking ("SDN"). According to SDN techniques, network administrators can configure a virtual network overlay across physical network infrastructure, defining a fully programmable data plane established by virtual network segments.

Data plane traffic in the form of packets can be carried over one or more network segments established between some number of ports of network devices. In the physical layer of a network, such network segments can be categorized as, for example, layer 2 network segments and layer 3 network segments according to the Open Systems Interconnection ("OSI") model. Generally, packets are encapsulated as frames and forwarded by switches over layer 2 network segments, and packets are forwarded by routers over layer 3 network segments.

This long-established demarcation between layer 2 and layer 3 network segments has been implemented analogously, in virtual network overlays. Network administrators can configure virtual network overlays to forward traffic originating from any number of computing hosts, but must configure the virtual network segments within the overlay to forward as layer 2 network segments, or as layer 3 network segments.

There is a need to further improve the configurability of virtual network overlays and the behavior of virtual network segments therein.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The devices depicted in the accompanying figures are not to scale and components within the figures may be depicted not to scale with each other.

DESCRIPTION OF EXAMPLE EMBODIMENTS

Overview

Figure 1:
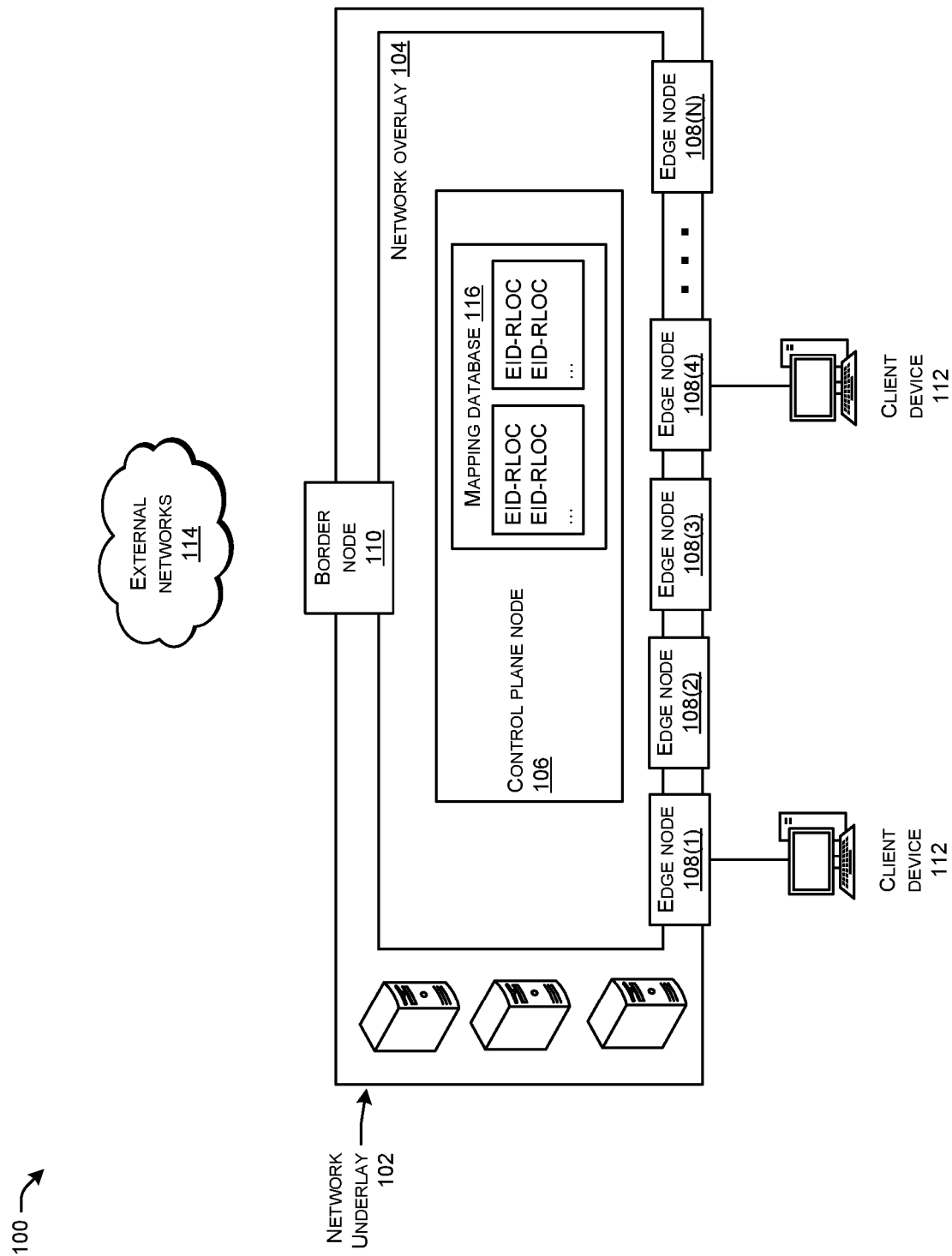
FIG. 1 illustrates a system-architecture diagram of an example network fabric, according to example embodiments of the present disclosure.

This disclosure describes techniques for intra-subnet forwarding data plane traffic over a virtual network overlay of a software-defined network fabric, among edge nodes in inter-compatible forwarding modes while those edge nodes are heterogeneously configured in forwarding modes, configuring any, some, or all edge nodes of the virtual network overlay to change forwarding modes over virtual network segments. To implement these inter-compatible forwarding modes, the edge nodes are further configured to respond to address resolution requests by proxy.

The described techniques may be implemented in one or more network devices having one or more processing units configured to execute computer-executable instructions, which may be implemented by, for example, one or more application specific integrated circuits ("ASICs"). The processing units may be configured by one or more non-transitory computer-readable media storing computer-executable instructions that, when executed by the processing units cause the processing units to perform the steps.

The method includes a processing unit of a network device (which can be one or more network devices making up a control plane node, such as a LISP Map Server) determining that an enhanced forwarding (EF)-configured edge node servicing a subnet of a virtual network overlay has disconnected from a virtual network instance; looking up the EF-configured edge node in a mapping database; and marking an Endpoint ID (EID)-Routing LOCator (RLOC) mapping returned from the lookup. The method further includes a processing unit notifying a traditional forwarding (TF)-configured edge node of the virtual network instance regarding the virtual network instance disconnection by the EF-configured edge node, and notifying one or more EF-configured edge nodes of mismatched pairing, wherein one or more members of a subnet of the virtual network overlay are connected to those one or more EF-configured edge nodes. The method further includes a processing unit of a network device (which can be an edge node) forwarding IP packets of a first traffic flow over a first virtual network segment established with a mismatched edge node according to an enhanced forwarding (EF)-compatible forwarding mode, and forwarding IP packets of a second traffic flow over a second virtual network segment established with a non-mismatched edge node according to traditional forwarding (TF). The method further includes a processing unit broadcasting, in response to a notification regarding a virtual network instance disconnection by an EF-configured edge node, a gratuitous address discovery response over one or more virtual network segments connected to TF-configured edge nodes of the virtual network instance, and responding, upon receiving a marked EID-RLOC mapping from a control plane node, to the received address discovery protocol request by proxy.

Additionally, the techniques described herein may be performed by a device having non-transitory computer-readable media storing computer-executable instructions that, when executed by one or more processors, performs the method described above.

Example Embodiments

Software-defined networking enables physical network nodes and computing resources to operate on a distributed basis as a common logical network infrastructure. Such techniques are increasingly used to increase computing and networking capacity and availability. An example of software-defined networking is Software-Defined Access ("SD-Access") from CISCO SYSTEMS INC. of San Jose, California. According to examples of software-defined networking such as SD-Access, a virtual network overlay may be defined across physical network nodes, the virtual network overlay logically unifying the computing resources of the physical network nodes to provide a variety of network services and network communication policies, while the physical nodes act as an underlay providing network traffic throughput and forwarding. An overlay and an underlay may be referred to in combination as a network fabric, which is an example architecture of a network as described in examples of the present disclosure.

Herein, it should be understood that, for succinctness, "nodes" can refer to any network devices underlying a network, including routers, switches, firewalls, and any other devices having decision-making logic.

The implementation of a network fabric according to examples of the present disclosure may include edge nodes which provide entry points for client devices to connect to the network fabric and access services and policies. Edge nodes may be virtual nodes delineating a logical parameter of the network fabric, without limitation as to their physical locations.

The implementation of a network fabric according to examples of the present disclosure may include border nodes which connect the network fabric to one or more outside networks. Outside networks may be one or more similar networks according to examples of the present disclosure, such as other network fabrics. Outside networks may be one or more non-virtual networks implemented by physical architecture. Outside networks may be one or more public or private local- or wide-area networks, or the Internet. Border nodes may be configured to connect to hosts outside the network fabric and forward outbound network traffic to those outside hosts, and to provide gateways to receive inbound network traffic from those hosts. Border nodes may be virtual nodes delineating a logical border of the network fabric with other networks, without limitation as to their physical locations.

The implementation of a network fabric according to examples of the present disclosure may include a fabric control plane node. The fabric control plane node may provide a logical storage which records client devices that have connected to the network fabric.

The implementation of a network fabric according to examples of the present disclosure may include intermediate nodes. Intermediate nodes may provide forwarding and interconnections between edge nodes, border nodes, and control plane nodes. For the purpose of this disclosure, intermediate nodes may be presumed to be present in the network fabric for the performance of these functions without further reference thereto henceforth.

By way of further explanation, the architecture of a network fabric can be divided, logically, into at least a control plane and a data plane. The control plane includes collective functions of a network which determine decision-making logic of data routing in the network. For example, the control plane includes hardware functions of a network which record, modify, and propagate routing table information. These hardware functions may be distributed among any number of network nodes of a network, including routers, switches, firewalls, and any other devices having decision-making logic.

The data plane includes collective functions of a network which perform data routing as determined by the above-mentioned decision-making logic. For example, the data plane includes hardware functions of a network which forward data packets. These hardware functions may be distributed among any number of network nodes of a network, including routers, switches, and other devices having inbound and outbound network interfaces, and hardware running computer-executable instructions encoding packet forwarding logic.

Network nodes of the data plane generally forward data packets according to next-hop forwarding. In next-hop forwarding, an ASIC of a network node, configured by computer-executable instructions, may evaluate, based on routing table information (which may be generated by control plane operations), a next-hop forwarding destination of a data packet received on an inbound network interface of a network node; and may forward the data packet over a network segment to the determined destination over an outbound network interface of the network node. It should be understood that individual network nodes do not reside wholly within the control plane or data plane, though their routing decision-making operations can define the control plane and their packet forwarding actions can define the data plane.

Network nodes can transport data traffic across the network fabric data plane over virtual network segments configured by encapsulation, such as VXLAN tunneling techniques. For example, for IP packets to be forwarded between edge nodes, or between an edge node and a border node, a network node can be configured to add a VXLAN header to the IP packet to enable the encapsulated packet to be transported between edge nodes, or between an edge node and a border node, by VXLAN tunneling.

Network administrators implementing a network fabric according to examples of the present disclosure can configure nodes of the network fabric to establish a private subnet and a public subnet. Network administrators can assign a block of private subnet addresses to nodes of the network fabric as NAT addresses, enabling nodes of the network fabric to be identified as members of a private subnet, and enabling traffic to be internally routed to the nodes of the network. Network administrators can assign a block of public IP addresses to nodes of the network fabric, enabling nodes of the network fabric to be identified as members of a public subnet, and enabling inbound network traffic from hosts outside the network to be addressed to the prefix of the public subnet addresses. Based on the least-significant bits of the destination IP addresses of inbound network traffic, network administrators can implement network address translation ("NAT") on nodes of the network fabric to translate private subnet addresses to public subnet addresses for outbound traffic from the network fabric, and to translate public subnet addresses to private subnet addresses for inbound traffic into the network fabric.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example network fabric 100.

In some examples, networking resources of a network fabric 100 may be a collection of physical nodes located across geographic areas forming a network underlay 102, over which a virtual network overlay 104 is logically defined. The network overlay 104 utilizes the resources of the network fabric to implement a control plane based at a control plane node 106, which, being a logically defined network device, may be distributed over one or many physical network devices of the underlay. The network overlay 104 utilizes the resources of the network to implement a data plane interconnecting edge nodes 108(1)-108(N) where N is any integer greater than "1" and at least one border node 110. The virtual network overlay 104 may be a distributed network through which a user may connect, via a client device 112, to any of edge nodes 108(1)-108(N) to interact with services and policies implemented on the network fabric 100. While a client device 112 is connected to the network fabric 100 in this manner, the client device 112 is an endpoint of the network fabric.

The network fabric 100 may provide, via connections to any edge node 108(1)-108(N), access to internal networks hosted in the network fabric 100 and/or access to external networks 114, including other network fabrics and public networks such as the Internet, through on-demand availability of networking resources, such as routing, forwarding, a data plane established by encapsulation, etc. In some examples, the network fabric 100 may be managed and maintained by a service provider hosting various services accessible on the network fabric 100 and defining various policies which govern use and availability of these services. Generally, a user and a client device 112 of the user may be mobile while connected to the network fabric 100, and thus the connection of the client device 112 to the virtual network overlay 104 may roam amongst each of the edge nodes 108(1)-108(N).

The control plane node 106 may host at least part of a mapping database 116 which tracks endpoint client devices 112 by a Routing LOCator ("RLOC") assigned to the endpoint client device 112. The RLOC may be assigned to the endpoint client device 112 by mapping the subnet address to a device IP address or a device MAC address by which the client device 112 identifies itself. The RLOC may be mapped to the device IP address or the device MAC address by implementation of protocols between the endpoint client device 112 and the control plane node 106 such as, for example, a Locator/ID Separation Protocol ("LISP"). Based on common LISP implementations, the device IP address or the device MAC address may be an Endpoint ID ("EID") of the client device 112. According to LISP implementations, the control plane node 106 may be called a LISP Map Server ("MS").

In accordance with LISP implementations, in an IP packet having the client device 112 as a destination, the EID of the client device 112 may be the destination IP address in the innermost header layer of the packet. The control plane node 106 may record in the mapping database 116 a mapping from an EID of a client device 112 to an RLOC of the client device 112. For the purpose of tracking the endpoint client device 112, the mapping may be further associated with a particular one of the edge nodes 108(1)-108(N) to which the endpoint client device 112 is connected, also referred to as the edge node which the endpoint client device 112 is "behind."

Whenever a client device 112 connects to one of the edge nodes 108(1)-108(N), the client device 112 may conduct a LISP registration for an EID of the client device 112 through the respective edge node with the control plane node 106, causing the control plane node 106 to assign an RLOC of the client device 112, and record a mapping from the EID of the client device 112 to the RLOC of the client device 112 in the mapping database 116 in association with one of the edge nodes 108(1)-108(N) which the endpoint client device 112 is behind. Every subsequent LISP registration of the client device 112 having the same EID at a different edge node of the edge nodes 108(1)-108(N) may cause the control plane node 106 to update the edge node which the endpoint client device 112 is behind in the registration of the EID of the endpoint client device 112.

For the purpose of forwarding traffic between the endpoint client device 112 and a host in the network fabric 100, a LISP registration of the client device 112 may map an EID of the client device 112 to an RLOC. For the purpose of forwarding traffic between the endpoint client device 112 and a host outside the network fabric 100, a LISP registration of the client device 112 may map an EID of the client device 112 to an RLOC.

In accordance with LISP implementations, any of the edge nodes 108(1)-108(N) and the border node 110 may each be both an ingress tunnel router ("ITR") and an egress tunnel router ("ETR") of the network fabric 100; according to LISP nomenclature each of these nodes may be referenced as an "xTR", denoting their status as both ITRs and ETRs.

Moreover, in accordance with VXLAN implementations, any of the edge nodes 108(1)-108(N) and the border node 110 may be a virtual tunnel endpoint ("VTEP") of the network fabric 100. For avoidance of doubt, it should be understood that a "virtual tunnel endpoint" refers to a network node, such as a router, to be distinguished from endpoint client devices, which are computing devices rather than network nodes as defined herein.

Therefore, a network administrator can configure LISP registration transactions between an endpoint client device 112 and a control plane node 106 of a network fabric 100, the control plane node 106 recording in a mapping database 116 mappings between an EID of the client device 112 and a RLOC assigned by the control plane node 106, the EID-RLOC mappings being operative to enable the control plane node 106 to identify any xTR of the network fabric 100 to which the client device 112 has connected, including edge nodes 108(1)-108(N) and the border node 110. A network administrator may also configure VXLAN mapping between an endpoint client device 112 and an edge node 108(1)-108(N) of a network fabric 100, the edge node 108(1)-108(N) recording in a local table mappings between a device identifier (for example, a MAC address) of the client device 112 and a VTEP interface, and the VXLAN mapping being operative to enable an edge node 108(1)-108(N) to identify a VTEP interface to which the device identifier is mapped, and therefore identify a virtual network identifier ("VNI") to which the mapped VTEP belongs.

It should be understood that according to example embodiments of the present disclosure, an endpoint client device 112 can join a network overlay 104 at an xTR, in accordance with EID-RLOC mappings at a control plane node 106; can join a network overlay 104 at a VTEP, in accordance with VXLAN mappings at an edge node 108(1)-108(N); can join a network overlay 104 at a provider edge ("PE") node, in accordance with Ethernet-over-MPLS ("EoMPLS"); and can otherwise join a network overlay 104 according to any suitable implementation of data plane traffic encapsulation similar to these examples as given above. In each such example, edge nodes 108(1)-108(N) are configured to receive IP packets from endpoint client devices 112; encapsulate those IP packets in accordance with implementation of a network overlay 104 (whether LISP encapsulation, VXLAN tunneling, EoMPLS encapsulation, and the like); forward the encapsulated packets over one or more virtual network segments configured between edge nodes; decapsulate encapsulated packets received over one or more virtual network segments; and forward decapsulated IP packets to other endpoint client devices 112.

In some contexts as described above, one or more virtual network segments making up the network overlay 104 may be described as "tunnels." For example, according to implementations of VXLAN tunneling, a "VXLAN tunnel" describes a virtual network segment between two edge nodes 108(1)-108(N) configured as VTEPs. According to LISP encapsulation, EoMPLS encapsulation, and other similar techniques, a virtual network segment may also be referred to as a "tunnel." It should be understood that such a "tunnel" can be established between any two edge nodes 108(1)-108(N) of a network fabric 100, whenever EID-RLOC mappings, VXLAN mappings, EoMPLS configuration, or otherwise configuration of a network overlay 104 cause data plane traffic originating from an endpoint client device 112, received at one edge node, to be forwarded to another edge node. "Encapsulation" and "decapsulation" refer to processes performed by edge nodes 108(1)-108(N) wherein headers, according to LISP, VXLAN, EoMPLS techniques and the like, are added to and removed from IP packets, causing IP traffic to become tunneled traffic as it is carried over one or more virtual network segments; IP packets encapsulated in this fashion cannot be forwarded over IP network segments, and IP packets not encapsulated in this fashion cannot be carried over virtual network segments of a network overlay 104.

However, two edge nodes 108(1)-108(N) which establish a virtual network segment or tunnel can be described as "endpoints" according to various terminology, such as according to the terminology "VTEP"; at the same time, ITRs, ETRs, xTRs, and PEs are not necessarily referred to as "endpoints." Therefore, and to avoid confusion with an endpoint client device 112, each such network device, whether an ITR, ETR, xTR, VTEP, PE, or any other such network device configured to forward traffic over a virtual network segment of a network overlay 104 is subsequently referred to as edge nodes 108(1)-108(N).

In some examples, the mappings recorded in the mapping database 116 may indicate to which edge node among edge nodes 108(1)-108(N) a tracked client device 112 is currently connected to. For instance, the mappings recorded in the mapping database 116 may have identities of respective edge nodes associated therewith.

However, it should be understood that network administrators can configure nodes of the network fabric 100 to establish one or more subnets, and thus a network overlay 104 can encompass one or more subnets of the network fabric 100. Therefore, edge nodes of the network fabric 100 may forward traffic within a same subnet (subsequently referred to as "intra-subnet forwarding," for brevity), and may forward traffic to a different subnet (subsequently referred to as "inter-subnet forwarding," for brevity).

According to different implementations of tunneling between edge nodes 108(1)-108(N), in accordance with the Open Systems Interconnection ("OSI") model, a network overlay 104 can be implemented using only layer 2 network communications, or can be implemented using both layer 2 and layer 3 network communications. Inter-subnet forwarding requires a network node to resolve an IP address of an IP packet to an address of a node in a different subnet, and therefore is performed by an edge node configured to perform IP routing according to layer 3 network communications.

Intra-subnet forwarding does not involve resolving an IP address to a destination node by its IP address. Therefore, intra-subnet forwarding can be performed by a network node resolving an IP address of an IP packet to a MAC address of a same-subnet destination node according to a forwarding table. Thus, an edge node 108(1)-108(N) can be configured to, in addition to encapsulating an IP packet according to one or more tunnel techniques, look up a same-subnet destination node for the encapsulated packet by referencing a locally stored layer 2 forwarding table. The control plane node 106 is configured to propagate a layer 2 forwarding table, containing forwarding information for each same-subnet network node (including a respective MAC address of each network node) to each of those network nodes. Such propagation among network nodes can be enabled by the network nodes being further configured to communicate over a virtual private network (distinct from the virtual network overlay), which can include further virtual network segments implemented using layer 2 network communications. Such a virtual private network can be configured separately from the network fabric 100.

Thus, the edge node 108(1)-108(N) identifies a MAC address of a same-subnet destination node and forwards the encapsulated packet over a virtual network segment. This process shall be subsequently referred to as "traditional forwarding" or "TF," for brevity, and an edge node configured according to the above shall be subsequently referred to as a "TF-configured edge node," for brevity.

Moreover, intra-subnet forwarding can also be performed by a network node resolving an IP address of an IP packet by receiving a MAC address of a same-network destination node according to an address discovery protocol. MAC addresses of each network node are not stored at each network node (and thus a virtual private network as described above is not needed to propagate forwarding information among network nodes), and the edge nodes 108(1)-108(N) are configured to perform the functions of routers, wherein an edge node receives packets forwarded over one or more network links from a host internal to or external to the one or more networks; determine a next hop, route, and/or destination to forward the packets to; and forward the packets to a host internal to or external to the one or more networks, determined by the next hop, route, and/or destination. An edge node 108(1)-108(N) may be configured to determine a next hop, route, and/or destination by any combination of static routing tables and various dynamic routing algorithms. Thus, for any subnet including two or more edge nodes 108(1)-108(N), some number of edge nodes can be configured as routers, i.e., configured with control plane functions to perform IP routing for each node of the subnet, in accordance with layer 3 network communications. Configuring edge nodes to perform IP routing also configures the edge nodes to perform inter-subnet forwarding of IP packets, in the event that any IP packet has a destination IP addressed in another subnet.

According to intra-subnet forwarding, control plane functions of edge nodes 108(1)-108(N) further include responding to requests of client devices 112 made according to an address discovery protocol, which can include the Address Resolution Protocol ("ARP"), Neighbor Discovery ("ND"), or any other communication protocol implemented between devices and nodes on a network segment, such a communication protocol configuring a device or node sending a packet to broadcast, multicast, or otherwise send request messages to discover a MAC address corresponding to an IP address of the packet to be sent. However, ARP does not include configuring a device or node to perform IP routing, ND does not necessarily include configuring a device or node to perform IP routing, and other such address discovery protocols likewise do not necessarily include configuring a device or node to perform IP routing.

Therefore, according to intra-subnet forwarding, control plane functions of edge nodes 108(1)-108(N) further include responding to address discovery protocols by proxy. Edge nodes are configured to intercept request messages according to an address discovery protocol; respond to request messages in accordance with an address discovery protocol, advertising a MAC address of the edge node itself; receive an IP packet from the request message sending device or node; and perform IP routing on the received IP packet. In this fashion, the request sending device or node performs message exchange according to an address discovery protocol without the IP routing performed by the responding edge node being exposed to the request sending device or node.

This above-described process, wherein control plane functions of edge nodes 108(1)-108(N) configure edge nodes to perform IP routing and respond to address discovery protocols by proxy, shall be subsequently referred to as "enhanced forwarding" or "EF," for brevity, and an edge node configured according to the above shall be subsequently referred to as an "EF-configured edge node," for brevity.

Conventionally, within a same network overlay 104, edge nodes 108(1)-108(N) are homogeneously either TF-configured edge nodes or EF-configured edge nodes, as described above. Conventionally, virtual network segments cannot be established between a TF-configured edge node and an EF-configured edge node, because neither edge node can discover the other as a forwarding next hop or destination for received IP packets. Therefore, in the event that there is substantial heterogeneity in configuration among edge nodes of a network overlay, many pairings of edge nodes will be unable to establish tunnels, thereby substantially limiting data plane traffic which can be forwarded over the network overlay between client devices connected to the network overlay, and thereby substantially limiting the utility that the network overlay provides to users of the network overlay.

Therefore, in the event that a network administrator wishes to change configuration of edge nodes of a network overlay 104 from TF to EF, the network administrator will be challenged by the need to maintain data plane traffic over the network overlay 104 at acceptable levels while changing configuration of a large number of network devices. Changing configurations of a large number of network devices is inherently a time-consuming process that would limit network traffic over the network overlay 104 for a protracted period of time, under the limitations of edge node configuration heterogeneity as described above.

Therefore, example embodiments of the present disclosure provide implementing intra-subnet forwarding of data plane traffic over a virtual network overlay of a software-defined network fabric, among edge nodes in inter-compatible forwarding modes while those edge nodes are heterogeneously configured in forwarding modes, configuring any, some, or all edge nodes of the virtual network overlay to change forwarding modes over virtual network segments. To implement these inter-compatible forwarding modes, the edge nodes are further configured to respond to address resolution requests by proxy. Techniques as described herein can not only prevent reduction of data plane traffic over the network overlay, but can also enable edge nodes of the network overlay to forward data plane traffic while indefinitely remaining heterogeneously configured, without later being homogeneously configured by a network administrator or a control plane node.

It should be understood that a network administrator or a control plane node can initially configure each edge node of a network overlay as TF-configured, or can initially configure each edge node of a network overlay as EF-configured. For the purpose of the present disclosure, it should be assumed that the network administrator may wish to reconfigure edge nodes in the first example to be EF-configured from being TF-configured, but may not need to reconfigure edge nodes in the second example to be TF-configured from being EF-configured. EF-configuration may provide more flexible computational processing of IP packets over TF-configuration, by the implementation of IP routing; furthermore, EF-configuration may be free from TF-configuration's need for services to be hosted for access by the edge nodes.

Therefore, subsequent references to "reconfiguration" should be understood as referring to a network administrator or a control plane node configuring TF-configured edge nodes, these TF-configured edge nodes making up at least some of the total edge nodes of a network overlay, to be EF-configured.

For the purpose of understanding example embodiments of the present disclosure, first, a simplified example of intra-subnet forwarding between two heterogeneously configured edge nodes is given. A first edge node is TF-configured, and a second edge node is EF-configured. Subsequently, such a pairing of a first edge node and a second edge node respectively configured according to heterogeneous forwarding modes shall be referred to as a "mismatched pair," for brevity, and from the perspective of each edge node, the other edge node is referred to as a "mismatched edge node." A pairing of a first edge node and a second edge node configured according to homogeneous forwarding modes (whether both TF-configured or both EF-configured) shall be referred to as a "matched pair," for contrast.

Given a mismatched pair of edge nodes of a network overlay, and a client device behind each edge node (according to "behind" as defined above), each client device may need to send an IP packet to the other client device over the network overlay. However, according to conventionally configured edge nodes, the first edge node will not be able to forward an IP packet to the second edge node by TF (though it can forward an IP packet to other edge nodes configured according to TF), and the second edge node will not be able to forward an IP packet to the first edge node by EF (though it can forward an IP packet to other edge nodes configured according to EF); a virtual network segment cannot be established between the first edge node and the second node in such an example. In the event that a network overlay includes many such mismatched pairs of edge nodes, the routine flow of data plane traffic over the network overlay would be substantially disrupted.

Therefore, according to example embodiments of the present disclosure, edge nodes of a network overlay are configured to perform intra-subnet forwarding between any mismatched pair of edge nodes (subsequently "mismatched forwarding"), are also configured to perform intra-subnet forwarding between any matched pair of edge nodes (subsequently "matched forwarding"), and are furthermore configured to perform mismatched forwarding and matched forwarding concurrently. Furthermore, edge nodes of a network overlay are configured to determine whether a traffic flow will be forwarded over a mismatched pair or will be forwarded over a matched pair. Furthermore, TF-configured edge nodes of a network overlay are configured to perform mismatched forwarding in an EF-compatible forwarding mode, and are configured to perform matched forwarding according to TF-configuration, as shall be described subsequently.

Conventionally, unlike a TF-configured edge node, an EF-configured edge node is not configured to propagate information over a virtual private network implemented using layer 2 network communications. However, in either case, both TF-configured edge nodes and EF-configured edge nodes are regardless configured to perform IP routing in accordance with layer 3 communications. Consequently, according to example embodiments of the present disclosure, any edge node of a network overlay of a virtual private network which is TF-configured can be configured to forward IP packets of a first traffic flow over a first virtual network segment established with a mismatched edge node according to an EF-compatible forwarding mode; and forward IP packets of a second traffic flow over a second virtual network segment established with a non-mismatched edge node according to TF. The above-mentioned aspects of a TF-configured edge node can, subsequently, be referred to as "EF-compatible forwarding," for the purpose of distinguishing from EF-configured forwarding.

It should be understood that any such edge node of a network overlay as described above can be manually EF-configured by a network administrator and can be EF-configured by a control plane node, and an EF-configured edge node no longer needs to perform EF-compatible forwarding.

Thus, among matched edge nodes, after one of the two matched edge nodes is EF-configured, according to example embodiments of the present disclosure the other of the two matched edge nodes, while it remains TF-configured, performs EF-compatible forwarding. However, rather than the TF-configured edge node determining that the two edge nodes are mismatched, a control plane node 106 as described above with reference to FIG. 1, which hosts at least part of a mapping database 116, determines that any EF-configured edge node is no longer serviced by a virtual private network instance ("VNI") servicing hosts of a subnet.

Figure 2:
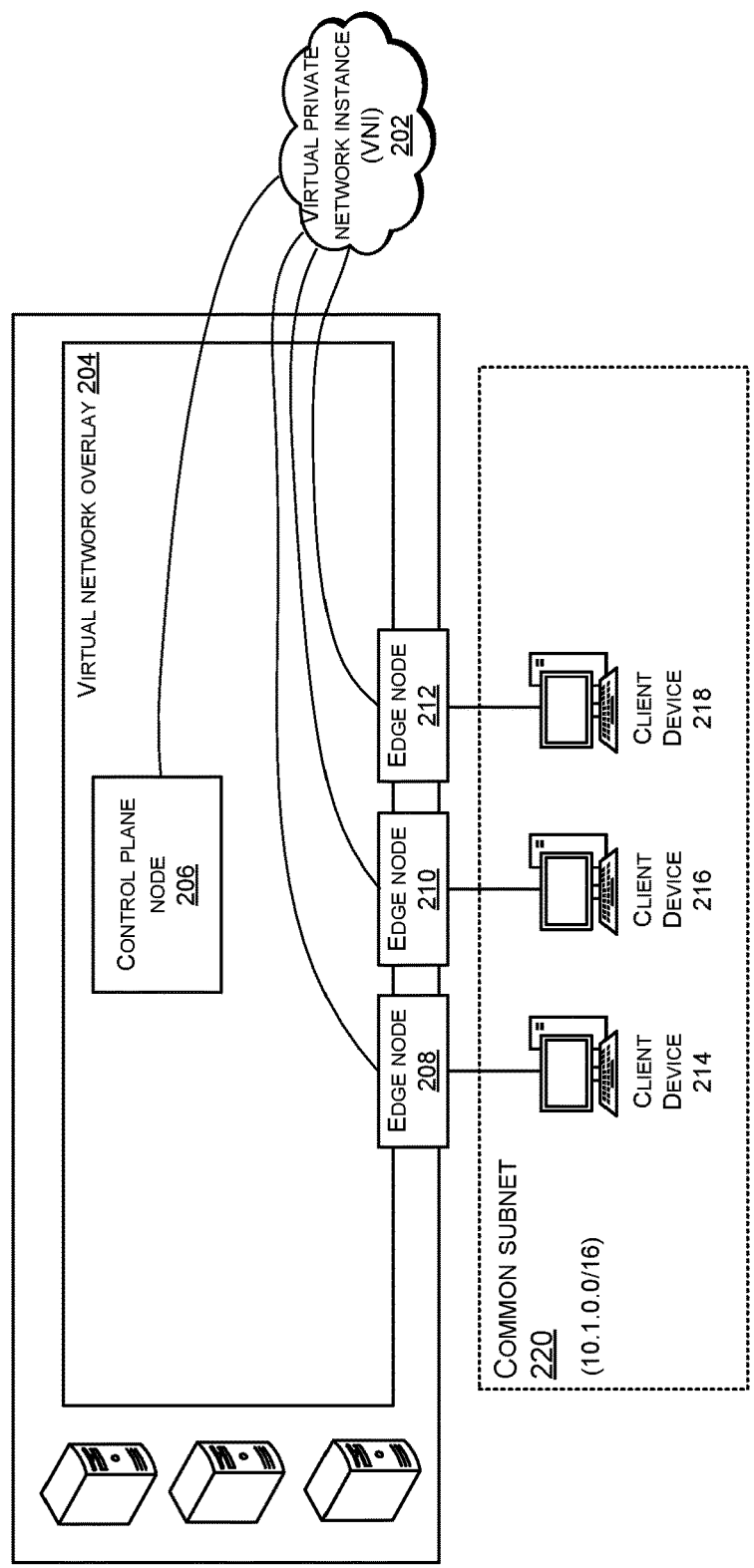
FIG. 2 illustrates a system-architecture diagram of an example network fabric in which edge nodes are serviced by a virtual private network instance, according to example embodiments of the present disclosure.

FIG. 2 illustrates a system-architecture diagram of an example network fabric 200 in which edge nodes are serviced by a VNI 202.

The example network fabric 200 is simplified from the example network fabric of FIG. 1, illustrating only a virtual network overlay 204 including a control plane node 206 and edge nodes 208, 210, and 212. Whereas edge nodes were interchangeably numbered in FIG. 1, here, each edge node is individually numbered to distinguish their different states over the course of the subsequently-described processes.

Multiple client devices are connected to each of edge nodes 208, 210, and 212, and each client device connected this way is connected to the network fabric 200 as an endpoint of the network. A client device connected to edge node 208 is numbered 214. A client device connected to edge node 210 is numbered 216. A client device connected to edge node 212 is numbered 218.

Furthermore, client devices behind the edge nodes 208, 210, and 212 are made members of a common subnet in the following fashion: each edge node configures a client device behind that respective edge node with a subnet address of a common block of subnet addresses, identifying these client devices as members of a common subnet 220. By way of example, each of the edge nodes 208, 210, and 212 herein may have subnet addresses having the subnet prefix 10.1.0.0/16. Each of the edge nodes 208, 210, and 212 connect to the VNI 202 by a VNI connection, each respective VNI connection being configured using a subnet address of a host of the VNI.

For this common subnet 220, assume that the VNI 202 services each TF-configured edge node servicing the common subnet 220 (where same-subnet TF-configured edge nodes, for the purpose of the present example, initially include at least edge nodes 208, 210, and 212) to implement the above-mentioned propagation of a layer 2 forwarding table, containing forwarding information for each same-subnet network node, from a control plane node 206 to each TF-configured edge node.

However, a TF-configured edge node becoming EF-configured causes its configured VNI connection to no longer be operative, by the removal of hosts of the VNI from network connection configuration information at the EF-configured edge node. Consequently, by the control plane node 206 detecting a TF-configured node dropping its configured VNI connection, the control plane node 206 can indirectly detect a TF-configured node being EF-configured.

Figure 3:
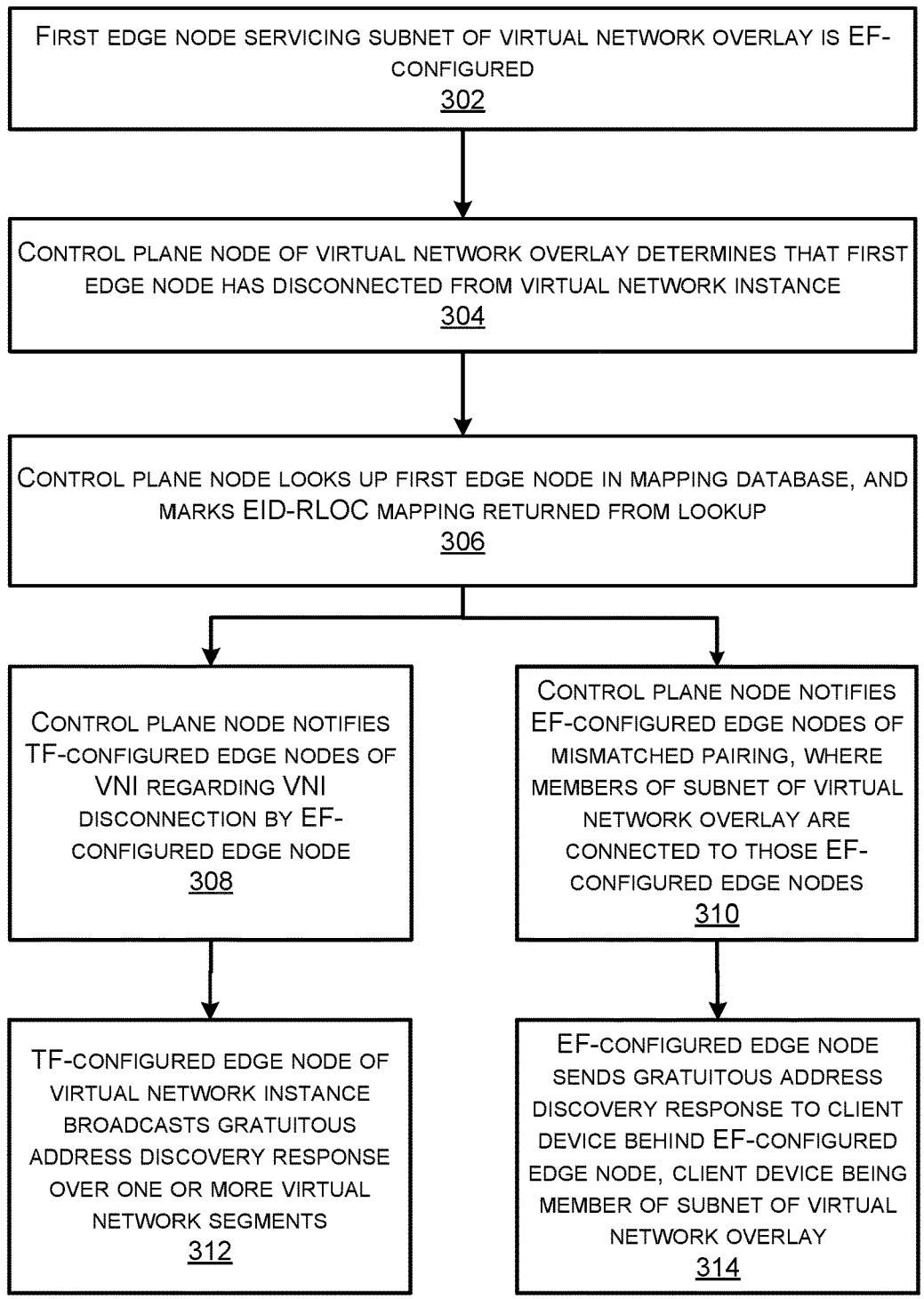
FIG. 3 illustrates a flow diagram of an example EF-compatible forwarding method according to example embodiments of the present disclosure.

FIG. 3 illustrates a flow diagram of an example EF-compatible forwarding method 300 according to example embodiments of the present disclosure, which shall be described with further reference to the example network fabric 200 of FIG. 2. The logical operations described herein with respect to FIG. 3 may be implemented (1) as a sequence of computer-implemented acts or program modules running on a computing system, such as a network node, and/or (2) as interconnected machine logic circuits or circuit modules within the computing system. The method may be executing on one or more processors of a virtual network overlay 204 logically defined over a physical hardware underlay. The virtual network overlay 204 may comprise one or more processors and one or more non-transitory computer-readable media storing computer-executable instructions that, when executed by the one or more processors, cause the one or more processors to perform the method 300.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic (which may virtualize physical hardware into one or more logical computing systems), and any combination thereof. It should also be appreciated that more or fewer operations might be performed than shown in FIG. 3 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

At a step 302, an edge node servicing a subnet of a virtual network overlay is EF-configured.

It should be understood that, as described above, edge nodes of a virtual network overlay are initially TF-configured. A network administrator can manually reconfigure, or a control plane node can reconfigure, any edge node of the virtual network overlay at any time. For example, a network administrator or a control plane node can incrementally EF-configure edge nodes of the virtual network overlay over time, leading to ultimately EF-configuring all edge nodes of the virtual network overlay. Alternatively, a network administrator or a control plane node can incrementally EF-configure edge nodes of the virtual network overlay over time, but stopping after only EF-configuring some of the edge nodes, without ultimately EF-configuring all edge nodes of the virtual network overlay. In either case, example embodiments of the present disclosure enable the edge nodes to perform intra-subnet forwarding of data plane traffic at substantially normal rates, even over mismatched pairs of edge nodes.

Herein, by way of example, edge node 208 as illustrated in FIG. 2 is EF-configured, while edge nodes 210 and 212 remain TF-configured. Therefore, edge nodes 208 and 210 are now a mismatched pair, and edge nodes 208 and 212 are also now a mismatched pair, while edge nodes 210 and 212 are a matched pair. However, edge nodes 210 and 212 have not yet discovered that they are both, respectively, mismatched pairs with edge node 208. The subsequent steps provide for edge nodes 210 and 212 learning that they are, respectively, mismatched pairs with edge node 208, and for edge nodes 210 and 212 to perform EF-compatible forwarding as a result.

At a step 304, a control plane node of the virtual network overlay determines that the EF-configured edge node has disconnected from a virtual network instance.

It should be understood that, as described above, edge nodes of a subnet 220 of a virtual network overlay 204 each connect to the VNI 202 by a VNI connection, each respective VNI connection being configured using the subnet address of the respective edge node. However, a TF-configured edge node becoming EF-configured causes its configured VNI connection to no longer be operative, by the removal of hosts of the VNI from network connection configuration information at the EF-configured edge node.

The control plane node 206 can be configured to detect that the edge node 208 has disconnected from a VNI 202, by detecting a loss of adjacency to the EF-configured edge node 208 while attempting to propagate forwarding information to the edge node 208 over the VNI 202.

Alternatively and/or additionally, the control plane node 206 does not need to detect that the edge node 208 has disconnected from the VNI 202. Instead, the edge node 208 can be configured to, upon a VNI host removal from its network connection configuration, broadcast a notification to the control plane node 206.

According to example embodiments of the present disclosure, the control plane node 206 should understand the VNI disconnection of the edge node 208 as indicating that the edge node 208 is now EF-configured.

At a step 306, the control plane node looks up the EF-configured edge node in a mapping database, and marks an EID-RLOC mapping returned from the lookup.

As described above, a mapping database tracks endpoint client devices by a Routing LOCator ("RLOC") assigned to the endpoint client device, where the RLOC may be assigned to the endpoint client device by mapping the subnet address to a device IP address or a device MAC address by which the client device identifies itself (a device identifier or EID, as described above). The mapping may be further associated with a particular edge node that the endpoint client device is "behind." Thus, the control plane node 206 can look up the EF-configured edge node in the mapping database, and identify one or more device IP addresses and/or one or more device MAC addresses returned from the lookup.

The returned one or more device IP addresses and/or one or more device MAC addresses should now be understood as being behind an EF-configured edge node 208, and therefore no longer reachable by intra-subnet TF forwarding. Therefore, the control plane node 206 marks the EID-RLOC mapping in the mapping database with an attribute, denoting that the client device identified by the EID requires TF-configured edge nodes to operate in an EF-compatible forwarding mode.

At a step 308, the control plane node notifies TF-configured edge nodes of the VNI regarding a VNI disconnection by the EF-configured edge node.

In notifying the edge nodes regarding a VNI disconnection, the control plane node 206 may forward a marked EID-RLOC mapping to each such edge node, such as edge nodes 210 and 212 by way of example herein. By this notification, the control plane node informs each remaining TF-configured edge node of the VNI 202 that one or more device IP addresses and/or MAC addresses to which edge node 208 is associated can no longer be resolved by a layer 2 forwarding table. Thus, those TF-configured edge nodes will need to perform EF-compatible forwarding to the edge node 208, in accordance with an address discovery protocol.

At a step 310, the control plane node notifies EF-configured edge nodes of mismatched pairing, where members of the subnet of the virtual network overlay are connected to those EF-configured edge nodes.

As mentioned above, client devices behind the edge nodes 208, 210, and 212 are made members of a common subnet 220 in the following fashion: each edge node configures a client device behind that respective edge node with a subnet address of a common block of subnet addresses, identifying these client devices as members of a common subnet 220. Therefore, in accordance with the subnet prefix 10.1.0.0/16 as given above by way of example, such subnet addresses of client devices should be those within the block of the 10.1.0.0 subnet.

In notifying the edge nodes of mismatched pairing, the control plane node 206 may forward a marked EID-RLOC mapping to each such edge node having a subnet member behind, such as edge node 208 by way of example herein. Each such edge node is notified by the marked EID-RLOC mapping that it should operate in an EF-compatible forwarding mode for at least traffic originating from the client device identified by the EID of the marked EID-RLOC mapping. The TF-configured edge node will thereafter enable an EF-compatible forwarding mode for identifying traffic flows as a first traffic flow or a second traffic flow, as shall be described subsequently.

It should be understood that the control plane node does not need to perform steps 308 and 310 in order, and can perform them in either order as well as concurrent to each other at least in part. Consequently, the order of the following steps 312 and 314, which follow from steps 308 and 310, respectively, can also vary, as shall be subsequently described.

At a step 312, a TF-configured edge node of the virtual network instance broadcasts a gratuitous address discovery response over one or more virtual network segments.

It should be understood that step 312 can be performed by a TF-configured edge node in response to receiving the notifications sent in step 308. Therefore, step 312, while following from step 308, does not need to strictly follow step 310, and can be performed at least in part concurrent to step 310 (and/or step 314, which follows from step 310).

As described above, one or more virtual network segments making up the network overlay 204 may be described as "tunnels." For example, according to implementations of VXLAN tunneling, a "VXLAN tunnel" describes a virtual network segment between two edge nodes configured as VTEPs. According to LISP encapsulation, EoMPLS encapsulation, and other similar techniques, a virtual network segment may also be referred to as a "tunnel." It should be understood that such a "tunnel" can be established between any two edge nodes of a network fabric 200, whenever EID-RLOC mappings, VXLAN mappings, EoMPLS configuration, or otherwise configuration of a network overlay 204 cause data plane traffic originating from an endpoint client device, received at one edge node, to be forwarded to another edge node.

Given that the TF-configured edge nodes 210 and 212 have already established some number of virtual network segments as described above, each with a different paired edge node, the TF-configured edge nodes 210 and 212 can each broadcast an address discovery response over each of these virtual network segments to unilaterally cause client devices behind each paired edge node to discover a MAC address of the TF-configured edge nodes 210 or 212, and bind this discovered MAC address in correspondence to a client device behind the EF-configured edge node 208.

Thus, the gratuitous address discovery response broadcast by each TF-configured edge node 210 and 212 includes the EID-RLOC mapping for the IP address of a client device 214 behind the EF-configured edge node 208, updated with the MAC address of the respective TF-configured edge node 210 or 212. In this manner, each TF-configured edge node 210 and 212 will not only set up itself to later resolve address discovery protocols by proxy (for EF-compatible forwarding, as shall be described subsequently), but will also unilaterally induce address discovery at client devices behind other edge nodes without those client devices initiating address discovery, while inducing those client devices to discover a MAC address of the TF-configured edge node rather than a device identifier of a client device behind the EF-configured edge node.

Such unilateral inducement of address discovery can cause client devices connected to the network overlay 204 to correctly forward traffic across the network overlay 204 to the TF-configured edge nodes which enforce inter-compatibility between the TF-configured edge nodes and the EF-configured edge nodes, rather than forward traffic across the network overlay 204 in a manner which is not inter-compatible between the TF-configured edge nodes and the EF-configured edge nodes, so that throughput of data plane traffic over the network overlay 204 is not reduced as a side effect of the heterogeneously configured edge nodes.

As described above, according to intra-subnet forwarding, control plane functions of edge nodes 210 and 212 include responding to requests of client devices made according to an address discovery protocol, which can include the Address Resolution Protocol ("ARP"), Neighbor Discovery ("ND"), or any other communication protocol implemented between devices and nodes on a network segment, such a communication protocol configuring a device or node sending a packet to broadcast, multicast, or otherwise send request messages to discover a MAC address corresponding to an IP address of the packet to be sent.

Thus, conventionally, in accordance with address discovery protocols, conventionally an edge node would send an address discovery response after receiving such a request message. However, for the purpose of enabling EF-compatible intra-subnet forwarding according to example embodiments of the present disclosure, the edge nodes 210 and 212 do not wait to receive such requests, rather unilaterally broadcasting gratuitous address discovery responses. A "gratuitous" response, herein, should be understood as a response according to an address discovery protocol which is not prompted by a request according to the address discovery protocol.

Because the response is gratuitous, the edge nodes 210 and 212 do not know which other TF-configured edge nodes, and which client devices behind those TF-configured edge nodes, might be interested in discovering the MAC address corresponding to the IP address of a client device behind the EF-configured edge node 208. Therefore, in broadcasting the gratuitous response, the edge nodes 210 and 212 broadcast the updated EID-RLOC mapping over virtual network segments which include edge nodes 210 and 212, so that the updated EID-RLOC mapping will reach each possible client device which might be interested in discovering the MAC address. However, the edge nodes 210 and 212 can limit the broadcasting to only virtual network segments over which network communications with client devices behind edge nodes have, within a threshold of recency, occurred. For example, a threshold of recency can be a span of 24 hours, corresponding to the longest period that locally cached bindings at a client device (as shall be described subsequently) can age before expiring.

Consequently, client devices behind each TF-configured edge node (including any number of nodes not illustrated in FIG. 2, for ease of understanding) paired with the edge nodes 210 and 212 will receive one or more gratuitous address discovery responses. Each client device (not illustrated in FIG. 2) is configured to parse messages according to an address discovery protocol, including gratuitous address discovery responses. According to an address discovery protocol, each client device has locally cached bindings between IP addresses of other client devices (those other client devices being connected to the network overlay 204) and their device identifiers, the device identifiers having been previously discovered during the client device routinely sending discovery requests, receiving responses, and parsing those responses according to one or more address discovery protocols.

Thus, as a result of the network overlay and subnet configuration of FIG. 2, each client device is expected to be configured to have, at some previous time, sent one or more discovery requests over the network overlay 204 (which were ultimately intercepted by edge nodes, as described above); received one or more responses to those discovery requests over the network overlay 204 (from the intercepting edge nodes, as described above); and locally cached a binding an IP address between another client device connected to the network overlay 204 and a MAC address of an edge node of the network overlay 204. In response to receiving a gratuitous response, each client device is, concordantly, expected to update such a locally cached binding between an IP address of another client device connected to the network overlay 204 and a MAC address, replacing it with a binding between the IP address of the other client device and a MAC address of the TF-configured edge node which broadcast the gratuitous response.

After the broadcast of these gratuitous responses, after some further time has passed, it is expected that each client device behind edge nodes of the virtual network instance will have received at least one gratuitous response, and will have correctly parsed the gratuitous response and initiated updating of locally cached bindings in accordance with an address discovery protocol. This updating process is described subsequently following step 314 in further detail.

However, while step 312 induces address discovery at client devices of the subnet 220 behind TF-configured edge nodes, this step does not induce address discovery at client devices of the subnet 220 behind EF-configured edge nodes. Thus, step 314 below, while following from step 310, does not need to strictly follow step 312, and can be performed at least in part concurrent to step 308 and/or at least in part concurrent to step 312.

At a step 314, an EF-configured edge node sends a gratuitous address discovery response to a client device behind the EF-configured edge node, the client device being a member of the subnet of the virtual network overlay.

Given that the TF-configured edge nodes 210 and 212 are unilaterally causing client devices behind each paired edge node to discover a MAC address of the TF-configured edge nodes 210 or 212, a client device behind an EF-configured edge node also needs to discover associations between IP addresses of those remote client devices with the EF-configured edge node.

Thus, the EF-configured edge node 208 does not broadcast a gratuitous address discovery response, but merely sends a gratuitous address discovery response to the client device behind the edge node 208. The gratuitous address discovery response includes an EID-RLOC mapping for an IP address of a client device behind a TF-configured edge node (210 or 212, in this example, though it should be understood that the edge node 208 should send such gratuitous address discovery responses for each such client device behind a TF-configured edge node), associated with the MAC address of the EF-configured edge node 208. In this manner, the EF-configured edge node 208 will not only set up itself to later resolve address discovery protocols by proxy (as configured by EF), but will also unilaterally induce address discovery at client devices behind the edge node 208 without those client devices initiating address discovery, while inducing those client devices to discover an IP address of a remote client device behind a TF-configured edge node.

Such unilateral inducement of address discovery can cause client devices connected to the network overlay 204 to correctly forward traffic addressed to remote client devices behind TF-configured nodes across the network overlay 204 through the EF-configured edge node, since the client devices behind EF-configured edge nodes may otherwise be unable to discover how to reach those remote client devices across the heterogeneously configured network overlay 204. This also averts throughput of data plane traffic over the network overlay 204 being reduced as a side effect of the heterogeneously configured edge nodes.

As described above, according to intra-subnet forwarding, control plane functions of edge node 208 include responding to requests of client devices made according to an address discovery protocol, which can include the Address Resolution Protocol ("ARP"), Neighbor Discovery ("ND"), or any other communication protocol implemented between devices and nodes on a network segment, such a communication protocol configuring a device or node sending a packet to broadcast, multicast, or otherwise send request messages to discover a MAC address corresponding to an IP address of the packet to be sent.

Thus, conventionally, in accordance with address discovery protocols, conventionally an edge node would send an address discovery response after receiving such a request message. However, for the purpose of enabling EF-compatible intra-subnet forwarding according to example embodiments of the present disclosure, the edge node 208 does not wait to receive such requests, rather unilaterally sending gratuitous address discovery responses to client devices behind the edge node 208. A "gratuitous" response, herein, should be understood as a response according to an address discovery protocol which is not prompted by a request according to the address discovery protocol.

Because the edge node 208 is removed from the VNI 202, it has no role in inducing remote client devices behind TF-configured edge nodes to perform address discovery; those remote client devices receive induced address discovery from TF-configured edge nodes instead. Therefore, in sending the gratuitous response, the edge node 208 sends the EID-RLOC mapping over a local network segment to the client device behind the edge node 208. However, the edge node 208 can limit the sending to only local network segments over which network communications with client devices behind edge nodes have, within a threshold of recency, occurred. For example, a threshold of recency can be a span of 24 hours, corresponding to the longest period that locally cached bindings at a client device (as shall be described subsequently) can age before expiring.

Consequently, client devices behind the edge node 208 will receive one or more gratuitous address discovery responses. Such a client device as client device 214 illustrated in FIG. 2 is configured to parse messages according to an address discovery protocol, including gratuitous address discovery responses. According to an address discovery protocol, each client device has locally cached bindings between IP addresses of other client devices (those other client devices being connected to the network overlay 204) and MAC addresses, the device identifiers having been previously discovered during the client device routinely sending discovery requests, receiving responses, and parsing those responses according to one or more address discovery protocols.

Thus, as a result of the network overlay and subnet configuration of FIG. 2, each client device is expected to be configured to have, at some previous time, sent one or more discovery requests over the network overlay 204 (which were ultimately intercepted by edge nodes, as described above); received one or more responses to those discovery requests over the network overlay 204 (from the intercepting edge nodes, as described above); and locally cached a binding between an IP address of another client device connected to the network overlay 204 and a MAC address of an edge node of the network overlay 204. In response to receiving a gratuitous response, each client device is, concordantly, expected to update such a locally cached binding between another client device connected to the network overlay 204 and a subnet address, replacing it with a binding between an IP address of the other client device and a MAC address of the EF-configured edge node which sent the gratuitous response.

After the gratuitous response is sent, after some further time has passed, it is expected that each client device behind the EF-configured edge node 208 will have received at least one gratuitous response, and will have correctly parsed the gratuitous response and initiated updating locally cached bindings in accordance with an address discovery protocol. This updating process is described subsequently in further detail below.

In order to update locally cached bindings in accordance with an address discovery protocol, client devices connected to the network overlay 204 can send address discovery protocol requests as normal. In the event that the client device is behind an EF-configured edge node, the EF-configured edge node can respond to the address discovery protocol request by proxy in accordance with EF, responding using its own MAC address.

According to example embodiments of the present disclosure, in the event that the client device is behind a TF-configured edge node, TF-configured edge nodes may also need to respond to the address discovery protocol request, in the event that the address discovery protocol request includes an IP address of a client device which is behind an EF-configured edge node. In order to determine whether or not such a case is occurring, a TF-configured edge node, after receiving an address discovery protocol request, is configured to forward the address discovery protocol request to a control plane node 206, requesting the control plane node 206 to return an EID-RLOC mapping containing a destination address in the address discovery protocol request.

By processes as described above, the control plane node 206 can determine whether a destination address in the address discovery belongs to a client device that is behind an EF-configured edge node. Thus, the destination address should now be understood as being no longer reachable by intra-subnet TF forwarding. Therefore, the control plane node 206 marks the EID-RLOC mapping in the mapping database with an attribute, denoting that the client device identified by the EID requires TF-configured edge nodes to operate in an EF-compatible forwarding mode.

The control plane node 206 may forward a marked EID-RLOC mapping to the TF-configured edge node. Thereby, the control plane node informs the TF-configured edge node that a destination address in the address discovery protocol request cannot be resolved by a layer 2 forwarding table. Thus, those TF-configured edge nodes will need to perform EF-compatible forwarding in accordance with an address discovery protocol.

Upon receiving this marked EID-RLOC mapping, the TF-configured edge node responds to the received address discovery protocol request by proxy, thus using this response to induce the requesting client device to discover a MAC address of the TF-configured edge node rather than a device identifier of a client device behind the EF-configured edge node.

In this fashion, TF-configured edge nodes are able to facilitate the discovery of client devices behind EF-configured edge nodes, which, unbeknownst to client devices behind TF-configured edge nodes, can no longer be reached over the VNI 202. This averts the possibility of client devices broadcasting address discovery protocol requests over the VNI 202 as a result of remote client devices being unreachable, which would increase congestion of network traffic while being futile in performing address discovery.

Therefore, after steps 312 and 314 are both completed, the client devices connected to the network overlay 204 have all updated their locally cached bindings; those client devices behind a TF-configured edge node can forward new and existing traffic flows of data plane traffic over the network overlay 204 through the TF-configured edge node; and those client devices behind an EF-configured edge node can forward new and existing traffic flows of data plane traffic over the network overlay 204 through the EF-configured edge node.

The EF-configured edge nodes forward this traffic as normal. By the above-mentioned induced address discovery protocol, TF-configured edge nodes can receive different traffic flows addressed in accordance with updated locally cached bindings, and resolve the addresses of different traffic flows according to layer 2 forwarding tables or according to IP routing. Thus, traffic flows can be characterized as a first traffic flow, wherein a destination address of an IP packet cannot be resolved in layer 2 forwarding tables, and so the TF-configured edge node performs IP routing and forwards IP packets of the first traffic flow over a first virtual network segment established with a mismatched edge node according to an EF-compatible forwarding mode. Traffic flows can be characterized as a second traffic flow, wherein a destination address of an IP packet can be resolved in layer 2 forwarding tables, and so the TF-configured edge node forwards IP packets of a second traffic flow over a second virtual network segment established with a non-mismatched edge node according to TF.

TF-configured edge nodes can keep an EF-compatible forwarding mode enabled until such time when all edge nodes servicing the common subnet 220 are converged in being EF-configured, whereupon edge nodes may disable an EF-compatible forwarding mode. It is also possible that a network administrator does not intend to EF-configure all edge nodes servicing the common subnet 220, in which case edge nodes may keep an EF-compatible forwarding mode enabled indefinitely.

By the operation of the EF-compatible forwarding method 300 as described above, edge nodes of a virtual network overlay are configured to continuously forward data plane traffic flows between client devices of a common subnet over the course of at least some of the edge nodes being EF-configured. TF-configured edge nodes and EF-configured edge nodes both play roles in unilaterally inducing address discovery by sending to client devices address discovery responses that were not prompted by address discovery requests. TF-configured edge nodes then handle ensuing address discovery requests by proxy, and subsequently handle certain traffic flows according to an EF-compatible forwarding mode depending on whether it can be resolved in layer 2 forwarding tables or not, while EF-configured edge nodes continue to forward traffic flows by IP routing normally. This averts throughput of data plane traffic over the network overlay being reduced as a side effect of the heterogeneously configured edge nodes, and averts the possibility of client devices broadcasting address discovery protocol requests as a result of remote client devices being unreachable.

Figure 4:
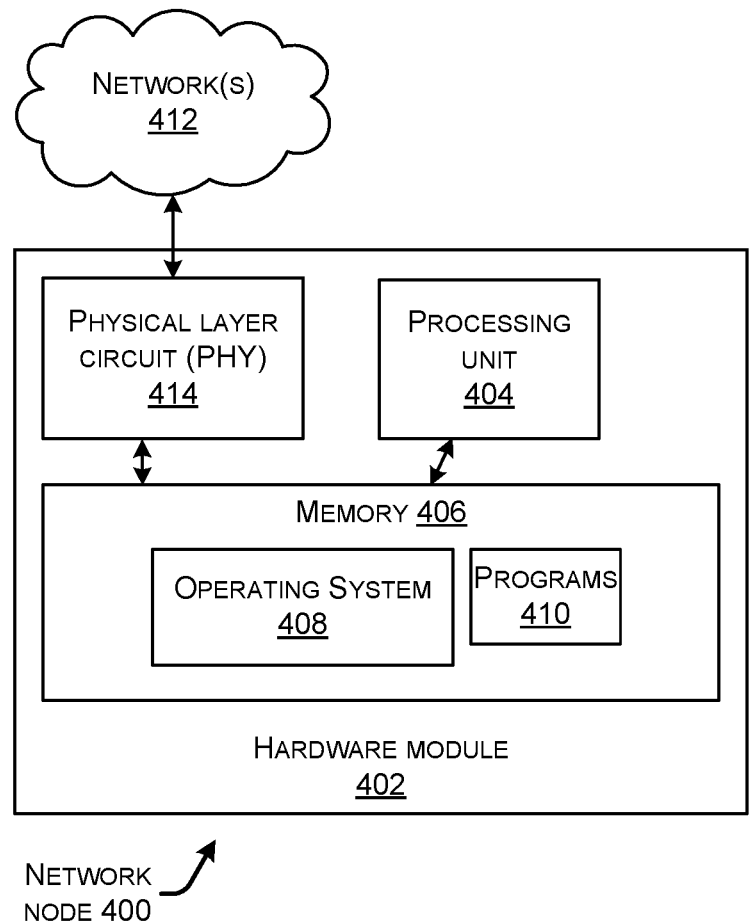
FIG. 4 illustrates an example architecture for a network node capable of being configured to implement the functionality described herein according to example embodiments of the present disclosure.

FIG. 4 illustrates an example architecture for a network node 400 capable of being configured to implement the functionality described above. The architecture shown in FIG. 4 illustrates a computing device assembled from modular components, and can be utilized to execute any of the software components presented herein.

The network node 400 may include one or more hardware modules 402, which may be a physical card or module to which a multitude of components or devices can be connected by way of a system bus or other electrical communication paths. Such a physical card or module may be housed in a standalone network device chassis, or may be installed in a rack-style chassis alongside any number of other physical cards or modules. In one illustrative configuration, one or more processing units 404 may be standard programmable processors or programmable ASICs that perform arithmetic and logical operations necessary for the operation of the hardware module 402.

The processing units 404 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

Integrated circuits may provide interfaces between the processing units 404 and the remainder of the components and devices on the hardware module 402. The integrated circuits may provide an interface to memory 606 of the hardware module 402, which may be implemented as on-chip memory such as TCAM, for storing basic routines configuring startup of the hardware module 402 as well as storing other software components necessary for the operation of the hardware module 402 in accordance with the configurations described herein. The software components may include an operating system 408, programs 410, and data, which have been described in greater detail herein.

The hardware module 402 may establish network connectivity in a network 412 by forwarding packets over logical connections between remote computing devices and computer systems. The integrated circuits may provide an interface to a physical layer circuit (PHY) 414 of the hardware module 402, which may provide Ethernet ports which enable the hardware module 402 to function as an Ethernet network adapter.

The hardware module 402 can store data on the memory 406 by transforming the physical state of the physical memory to reflect the information being stored. The specific transformation of physical state can depend on various factors, in different embodiments of this description. Examples of such factors can include, but are not limited to, the technology used to implement the memory 406, whether the memory 406 is characterized as primary or secondary storage, and the like.

For example, the hardware module 402 can store information to the memory 406 by issuing instructions through integrated circuits to alter the electrical characteristics of a particular capacitor, transistor, or other discrete component in a solid-state storage unit. Other transformations of physical media are possible without departing from the scope and spirit of the present description, with the foregoing examples provided only to facilitate this description. The hardware module 402 can further read information from the memory 406 by detecting the physical states or characteristics of one or more particular locations within the memory 406.

The memory 406 described above may constitute computer-readable storage media, which may be any available media that provides for the non-transitory storage of data and that can be accessed by the hardware module 402. In some examples, the operations performed by the network node 400, and/or any components included therein, may be supported by one or more devices similar to the hardware module 402. Stated otherwise, some or all of the operations performed by the network node 400, and/or any components included therein, may be performed by one or more hardware modules 402 operating in a networked, distributed or aggregated arrangement over one or more logical fabric planes over one or more networks.

By way of example, and not limitation, computer-readable storage media can include volatile and non-volatile, removable and non-removable media implemented in any method or technology. Computer-readable storage media includes, but is not limited to, TCAM, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the memory 406 can store an operating system 408 utilized to control the operation of the hardware module 402. According to one embodiment, the operating system comprises the CISCO NX-OS operating system from CISCO SYSTEMS INC. of San Jose, California. It should be appreciated that other operating systems can also be utilized. The memory 406 can store other system or application programs and data utilized by the hardware module 402.

In one embodiment, the memory 406 or other computer-readable storage media is encoded with computer-executable instructions which transform any processing units 404 from a general-purpose computing system into a special-purpose computer capable of implementing the embodiments described herein. These computer-executable instructions specify how the processing units 404 transition between states, as described above. According to one embodiment, the hardware module 402 has access to computer-readable storage media storing computer-executable instructions which, when executed by the hardware module 402, perform the various processes described above with regard to FIGS. 1-3. The hardware module 602 can also include computer-readable storage media having instructions stored thereupon for performing any of the other computer-implemented operations described herein.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A network device comprising:
one or more processing units; and
one or more non-transitory computer-readable media storing computer-executable instructions that, when executed by the one or more processing units, cause the one or more processing units to:
map an Endpoint ID (EID) of an endpoint client device to a Routing LOCator (RLOC) assigned to the endpoint client device, and associate the EID-RLOC mapping with a first edge node of a network fabric servicing a subnet of a virtual network overlay, wherein the first edge node is connected to a virtual network instance configured separately from the network fabric;

detect that the first edge node has disconnected from the virtual network instance while attempting to propagate forwarding information to the first edge node over the virtual network instance, wherein the first edge node has disconnected from the virtual network instance due to the first edge node being reconfigured to respond to address discovery protocols by proxy during intra-subnet forwarding;

look up the disconnected first edge node in an EID-RLOC mapping database;

mark an EID-RLOC mapping returned from the lookup with an attribute indicating operation in an enhanced forwarding (EF)-compatible forwarding mode for traffic originating from the endpoint client device; and forward the marked EID-RLOC mapping to a second edge node of the network fabric, wherein the second edge node is connected to the virtual network instance and is configured to resolve an IP address to a MAC address during intra-subnet forwarding.

2. The network device of claim 1, wherein the instructions cause the one or more processing units to determine that the first edge node has disconnected from the virtual network instance by receiving a broadcast notification from the first edge node.

3. The network device of claim 1, wherein the instructions further cause the one or more processing units to notify the second edge node of the virtual network instance regarding virtual network instance disconnection by the first edge node, the second edge node being configured to identify a MAC address of a same-subnet destination node during intra-subnet forwarding.

4. The network device of claim 3, wherein notifying the second edge node comprises forwarding the marked EID-RLOC mapping to the second edge node.

5. The network device of claim 1, wherein the instructions further cause the one or more processing units to notify one or more edge nodes of mismatched pairing, wherein one or more members of a subnet of the virtual network overlay are connected to those one or more edge nodes, the one or more edge nodes being configured to respond to address discovery protocols by proxy during intra-subnet forwarding.

6. The network device of claim 5, wherein notifying the one or more edge nodes comprises forwarding the marked EID-RLOC mapping to the one or more edge nodes.

7. A method comprising:

mapping an Endpoint ID (EID) of an endpoint client device to a Routing LOCator (RLOC) assigned to the endpoint client device, and associating the EID-RLOC mapping with a first edge node of a network fabric servicing a subnet of a virtual network overlay, wherein the first edge node is connected to a virtual network instance configured separately from the network fabric;

detecting that the first edge node has disconnected from the virtual network instance while attempting to propagate forwarding information to the first edge node over the virtual network instance, wherein the first edge node has disconnected from the virtual network instance due to the first edge node being reconfigured to respond to address discovery protocols by proxy during intra-subnet forwarding;

looking up the disconnected first edge node in an EID-RLOC mapping database;

marking an Endpoint ID (EID)-Routing LOCator (RLOC) EID-RLOC mapping returned from the lookup with an attribute indicating operation in an enhanced forwarding (EF)-compatible forwarding mode for traffic originating from the endpoint client device; and forwarding the marked EID-RLOC mapping to a second edge node of the network fabric, wherein the second edge node is connected to the virtual network instance and is configured to resolve an IP address to a MAC address during intra-subnet forwarding.

8. The method of claim 7, wherein determining that the first edge node has disconnected from the virtual network instance comprises receiving a broadcast notification from the first edge node.

9. The method of claim 7, further comprising notifying the second edge node of the virtual network instance regarding virtual network instance disconnection by the first edge node.

10. The method of claim 9, wherein notifying the second edge node comprises forwarding the marked EID-RLOC mapping to the second edge node further comprising notifying one or more edge nodes of mismatched pairing, wherein one or more members of a subnet of the virtual network overlay are connected to those one or more edge nodes, the one or more edge nodes being configured to respond to address discovery protocols by proxy during intra-subnet forwarding.

11. The method of claim 7, further comprising notifying one or more edge nodes of mismatched pairing, wherein one or more members of a subnet of the virtual network overlay are connected to those one or more edge nodes.

12. The method of claim 11, wherein notifying the one or more edge nodes comprises forwarding the marked EID-RLOC mapping to the one or more edge nodes.

* * * * *